United States Patent
Saito et al.

(10) Patent No.: US 10,464,424 B2
(45) Date of Patent: Nov. 5, 2019

(54) ON-VEHICLE ELECTRIC POWER STORAGE APPARATUS

(71) Applicant: Mitsubishi Electric Corporation, Tokyo (JP)

(72) Inventors: Hiroyuki Saito, Tokyo (JP); Hideaki Tani, Tokyo (JP); Satoshi Wachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 77 days.

(21) Appl. No.: 15/560,526

(22) PCT Filed: Mar. 31, 2015

(86) PCT No.: PCT/JP2015/060102
§ 371 (c)(1),
(2) Date: Sep. 22, 2017

(87) PCT Pub. No.: WO2016/157405
PCT Pub. Date: Oct. 6, 2016

(65) Prior Publication Data
US 2018/0111482 A1    Apr. 26, 2018

(51) Int. Cl.
*B60L 3/00* (2019.01)
*B60L 11/18* (2006.01)
(Continued)

(52) U.S. Cl.
CPC .............. *B60L 3/00* (2013.01); *B60L 3/0007* (2013.01); *B60L 3/04* (2013.01); *B60L 58/26* (2019.02);
(Continued)

(58) Field of Classification Search
CPC .......... B60L 3/00; B60L 11/1874; B60L 3/04; B60L 3/0007; Y10S 903/907;
(Continued)

(56) References Cited

U.S. PATENT DOCUMENTS

| 2014/0111139 A1* | 4/2014 | Chen | H01F 27/28 320/107 |
| 2015/0357681 A1* | 12/2015 | Kwon | H01M 10/6572 429/9 |

FOREIGN PATENT DOCUMENTS

| JP | 04-312304 A | 11/1992 |
| JP | 09-074603 A | 3/1997 |

(Continued)

OTHER PUBLICATIONS

International Search Report for PCT/JP2015/060102 dated May 19, 2015 [PCT/ISA/210].
(Continued)

*Primary Examiner* — Jerrah Edwards
*Assistant Examiner* — Mathew Franklin Gordon
(74) *Attorney, Agent, or Firm* — Sughrue Mion, PLLC; Richard C. Turner

(57) ABSTRACT

This invention concerns an on-vehicle electric power storage apparatus including: a control unit 6 which performs internal control; a load 7 which is connected to a high voltage battery 3 via a switch 8 based on a command from the control unit 6, and forcibly consumes the power charged in the high voltage battery 3; and a cooling apparatus 10 which is driven based on a command from the control unit 6 and cools the high voltage battery 3. When collision of a vehicle is detected by a collision detection unit 14, the control unit 6 forcibly consumes the power in the high voltage battery 3 using the load 7, and cools the high voltage battery 3 using the cooling apparatus 10.

4 Claims, 4 Drawing Sheets

(51) Int. Cl.
*H01M 10/613* (2014.01)
*H01M 10/625* (2014.01)
*H01M 10/63* (2014.01)
*H01M 10/6563* (2014.01)
*H02J 7/00* (2006.01)
*B60L 3/04* (2006.01)
*B60L 58/26* (2019.01)
*H01M 10/42* (2006.01)
*B60K 6/28* (2007.10)
*B60K 1/00* (2006.01)

(52) U.S. Cl.
CPC ....... *H01M 10/613* (2015.04); *H01M 10/625* (2015.04); *H01M 10/63* (2015.04); *H01M 10/6563* (2015.04); *H02J 7/0029* (2013.01); *H02J 7/0063* (2013.01); *B60K 6/28* (2013.01); *B60K 2001/005* (2013.01); *B60Y 2200/91* (2013.01); *B60Y 2200/92* (2013.01); *B60Y 2306/05* (2013.01); *B60Y 2400/112* (2013.01); *H01M 2010/4271* (2013.01); *H01M 2200/00* (2013.01); *H01M 2220/20* (2013.01); *H02J 2007/0067* (2013.01); *Y10S 903/907* (2013.01)

(58) Field of Classification Search
CPC ............. H02J 2007/0067; H02J 7/0063; H02J 7/0029; H01M 2010/4271; H01M 10/6563; H01M 10/63; H01M 10/625; H01M 10/613; H01M 2200/20; H01M 2200/00; B60Y 2400/112; B60Y 2306/05; B60Y 2200/92; B60Y 2200/91; B60K 2001/005; B60K 6/28
See application file for complete search history.

(56) References Cited

FOREIGN PATENT DOCUMENTS

| | | |
|---|---|---|
| JP | 2001-339863 A | 12/2001 |
| JP | 3893965 B2 | 3/2007 |
| WO | 2014/196808 A1 | 12/2014 |
| WO | 2015/040673 A1 | 3/2015 |

OTHER PUBLICATIONS

Written Opinion for PCT/JP2015/060102 dated May 19, 2015 [PCT/ISA/237].

Communication dated Jan. 9, 2018 from the Japanese Patent Office in counterpart application No. 2017-508919.

* cited by examiner

ON-VEHICLE ELECTRIC POWER STORAGE APPARATUS

CROSS REFERENCE TO RELATED APPLICATIONS

This application is a National Stage of International Application No. PCT/JP2015/060102 filed Mar. 31, 2015, the contents of all of which are incorporated herein by reference in their entirety.

TECHNICAL FIELD

This invention relates to an on-vehicle electric power storage apparatus, and more particularly to an on-vehicle electric power storage apparatus installed in an automobile using electric energy stored in a battery as the power source thereof.

BACKGROUND ART

A battery is normally equipped in a vehicle, such as an automobile. Electric energy is temporarily stored in this battery. For example, to store the electric energy, a generator is connected to an internal combustion engine via a belt or the like, and electric energy, which is generated by the generator as the internal combustion engine rotates, is stored in the battery. By storing the electric energy in the battery like this, the power required for electric apparatuses can be supplied from the battery, even in a state where the internal combustion engine is not rotating and the generator cannot generate power.

Moreover, a vehicle equipped with a plurality of batteries, to efficiently convert the energy of the vehicle into electric energy during deceleration time and charge the batteries with the electric energy, has been developed recently. The plurality of batteries include a battery to efficiently store the electric energy of the vehicle, and a battery used for, for example, starting the vehicle.

These batteries and the wiring from the batteries to the electric apparatuses are normally insulated so that that batteries and wiring are not directly touched by a driver or a maintenance worker. However when collision of the vehicle occurs, there is a risk that the insulated portions are destroyed and a driver or a maintenance worker receives an electric shock.

An example of a safety measure addressing the collision of a vehicle is disclosed in PTL 1, for example. In PTL 1, electric shock, in the case of an accident, is prevented by forcibly consuming the energy stored in the battery using a load.

CITATION LIST

Patent Literature

[PTL 1] Japanese Patent No. 3893965

SUMMARY OF INVENTION

Technical Problem

According to the above mentioned PTL 1, the energy stored inside the battery is discharged using a load to consume power once a collision of the vehicle occurs. However, heavy current may be discharged depending on the resistance of the load. If this occurs, the battery may heat up and combust.

With the foregoing in view, it is an object of the present invention to provide an on-vehicle electric power storage apparatus which can discharge heavy current and cool the battery using a cooling apparatus when an accident occurs, so as to prevent combustion of the battery and improve safety.

Solution to Problem

The present invention is an on-vehicle electric power storage apparatus installed in a vehicle which has an on-vehicle power supply as a power source, the on-vehicle power supply including one or a plurality of batteries, and the on-vehicle electric power storage apparatus including: a control unit which performs internal control of the on-vehicle electric power storage apparatus; a load which is connected to the on-vehicle power supply based on a command from the control unit, and forcibly consumes power charged in the battery of the on-vehicle power supply; and a cooling apparatus which is driven based on a command from the control unit, and cools the battery of the on-vehicle power supply, wherein when a collision of the vehicle is detected, the control unit forcibly consumes the power in the battery using the load, and cools the battery using the cooling apparatus.

Advantageous Effects of Invention

According to the on-vehicle electric power storage apparatus of this invention, when a collision of the vehicle occurs, the power of the battery is forcibly consumed using the load, and the battery is cooled using the cooling apparatus, therefore despite an accident occurring, heavy current can be discharged and the battery can be cooled by the cooling apparatus, so as to prevent combustion of the battery and improve safety.

DESCRIPTION OF EMBODIMENTS

Embodiments of the on-vehicle electric power storage apparatus according to this invention will now be described in detail with reference to the drawings. The embodiments to be described below are merely examples of this invention, and are not intended to limit the scope of this invention.

Embodiment 1

Figure 1:
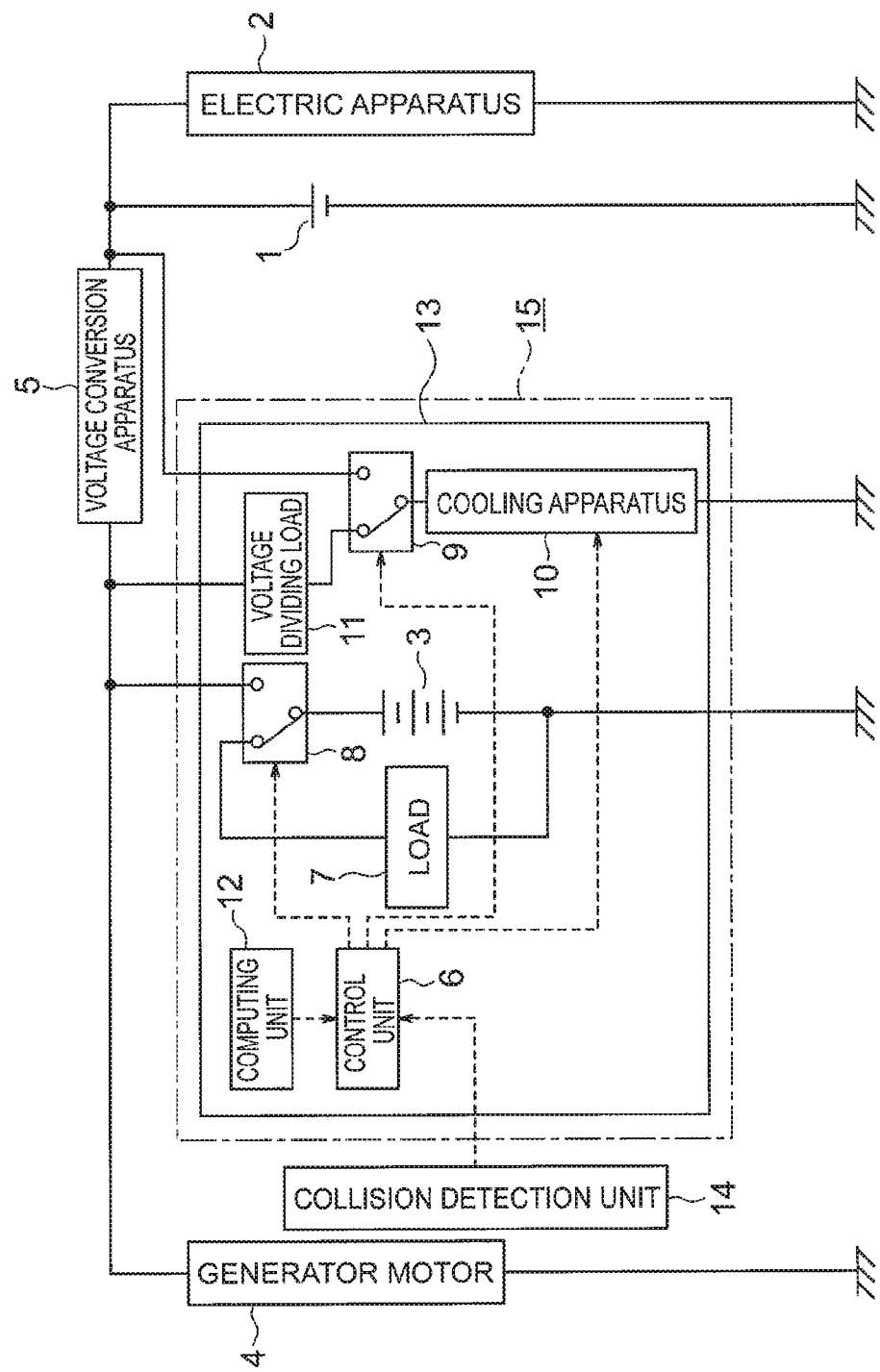
FIG. 1 is a block diagram depicting a configuration of a power supply system of an internal combustion engine in which an on-vehicle electric power storage apparatus, according to Embodiment 1 of this invention, is installed.

FIG. 1 is a block diagram depicting an on-vehicle electric power storage apparatus according to Embodiment 1 of this invention, and a peripheral power supply system of the vehicle.

In FIG. 1, the on-vehicle electric power storage apparatus 15 is installed in a vehicle, such as an automobile. "Automobile" here is not limited to a hybrid vehicle, but also include an electric vehicle. A hybrid vehicle refers to an automobile which is equipped with both a motor driven by electric energy and an internal combustion engine driven by gas as power sources. An electric vehicle has only electric energy outputted from a battery as a power source. In the following description, a hybrid vehicle is used as an example of "automobile".

As depicted in FIG. 1, the on-vehicle electric power storage apparatus 15 has a case 13. The case 13 houses a high voltage battery 3, a control unit 6, a load 7, a switch 8, a switch 9, a cooling apparatus 10, a voltage dividing load 11, and a computing unit 12.

Further, as depicted in FIG. 1, a low voltage battery 1, an electric apparatus 2, a generator motor 4 and a voltage conversion apparatus 5 are connected to the on-vehicle electric power storage apparatus 15. The low voltage battery 1 supplies power to the electric apparatus 2. The low voltage battery 1 is constituted by a lead battery, for example. The rated voltage of the low voltage battery 1 is 12V, for example. The electric apparatus 2 includes electric apparatuses in general which are installed in the vehicle, such as an air conditioner, stereo, car navigation, power windows, power steering and lights. Further, a collision detection unit 14 is connected to the on-vehicle electric power storage apparatus 15.

The high voltage battery 3 is one power source that drives the vehicle. This embodiment is based on the assumption that the vehicle is a hybrid vehicle, hence the other power source is an internal combustion engine (see reference sign 16 in FIG. 3). The high voltage battery 3 exchanges power with the generator motor 4. In other words, the high voltage battery 3 is charged with power from the generator motor 4, and also supplies power to the generator motor 4 to drive the generator motor 4. The high voltage battery 3 is constituted by a lithium-ion battery, for example. The rated voltage of the high voltage battery 3 is 400V, for example. However, the high voltage battery 3 is not limited to the lithium-ion battery, and may also be another type of battery.

Figure 3:
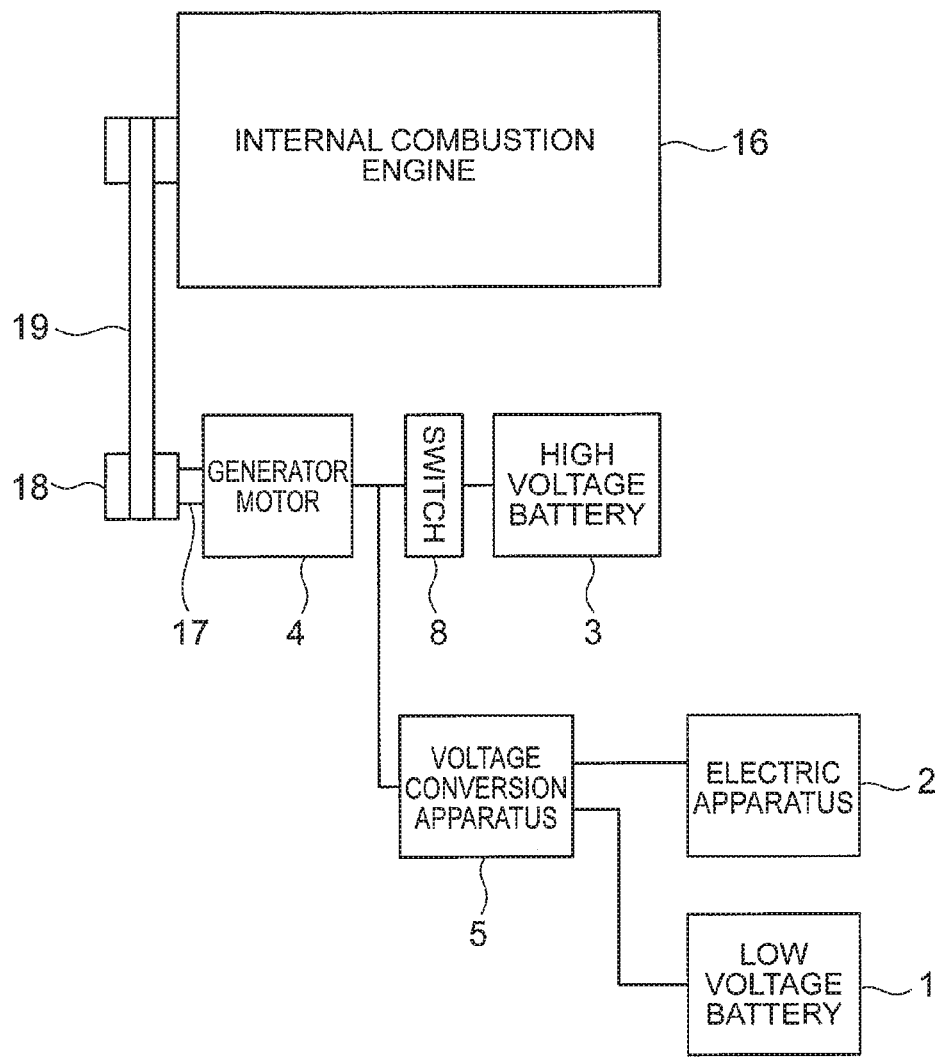
FIG. 3 is a block diagram depicting an example of the connection between a generator motor and the internal combustion engine according to Embodiment 1 of this invention.

The generator motor 4 is connected to the internal combustion engine 16. For example, as depicted in FIG. 3, a pulley 18 is installed on a rotor axis 17 of the generator motor 4, and is connected to the internal combustion engine 16 via a belt 19. When the internal combustion engine 16 rotates, the generator motor 4 also rotates via the belt 19. When the generator motor 4 rotates, the generator motor 4 generates power. The generated electric energy is either charged to the high voltage battery 3, or is inputted to the voltage conversion apparatus 5. The voltage conversion apparatus 5 performs voltage conversion for this electric energy, and inputs the converted voltage to the electric apparatus 2 or the low voltage battery 1. The electric apparatus 2 consumes this electric energy, and the low voltage battery 1 is charged with this electric energy.

The voltage conversion apparatus 5 converts voltage to exchange power between the high voltage side and the low voltage side. The voltage conversion apparatus 5 is unnecessary if the voltage at the high voltage side and the voltage at the low voltage side have approximately the same potential. Therefore a switch may be disposed instead of the voltage conversion apparatus 5.

The control unit 6 controls the switch 8, the switch 9 and the cooling apparatus 10.

The switch 8 switches the state between the normal operation time and the emergency time based on a command signal from the control unit 6. In the normal operation time, the switch 8 connects the low voltage battery 1 and the load 7, so that the charged energy in the low voltage battery 1 is consumed by the load 7. In the emergency time, on the other hand, the switch 8 connects the high voltage battery 3 and the load 7, so that the charged energy in the high voltage battery 3 is forcibly consumed by the load 7.

The switch 9 is connected to the cooling apparatus 10. The cooling apparatus 10 cools the high voltage battery 3. The cooling apparatus 10 is constituted by a cooling fan which is installed in the on-vehicle electric power storage apparatus 15. The switch 9 connects either the low voltage battery 1 or the high voltage battery 3 to the cooling apparatus 10 depending on the command signal from the control unit 6. In the normal operation time, the switch 9 connects the low voltage battery 1 and the cooling apparatus 10, so that the cooling apparatus 10 is driven using the power of the low voltage battery 1. In the emergency time, the switch 9 connects the high voltage battery 3 and the cooling apparatus 10 via the voltage dividing load 11, so that the cooling apparatus 10 is driven using the power of the high voltage battery 3. In this way, in the normal operation time, the cooling apparatus 10 uses the power of the low voltage battery 1, and the cooling apparatus 10 does not support the voltage of the high voltage battery 3. Therefore the voltage dividing load 11 is required.

The voltage dividing load 11 lowers the voltage that is applied from the high voltage battery 3 to the cooling apparatus 10 by dividing the voltage, so as to be within the drivable voltage range of the cooling apparatus 10.

The computing unit 12 is connected to the control unit 6. A current sensor (not illustrated) and a voltage sensor (not illustrated) are disposed in the high voltage battery 3. The computing unit 12 computes the state of charge of the high voltage battery 3 based on the information from the current sensor and the voltage sensor of the high voltage battery 3, and inputs the computed result to the control unit 6.

For the collision detection unit 14, a collision sensor included in an air bag control apparatus (not illustrated) or the like is used. However, the present invention is not limited to this, and the collision detection unit 14 may be installed independently from the collision sensor of the air bag control apparatus. When the collision of the vehicle is detected, the collision detection unit 14 inputs a detection signal to notify this collision to the control unit 6.

Figure 4:
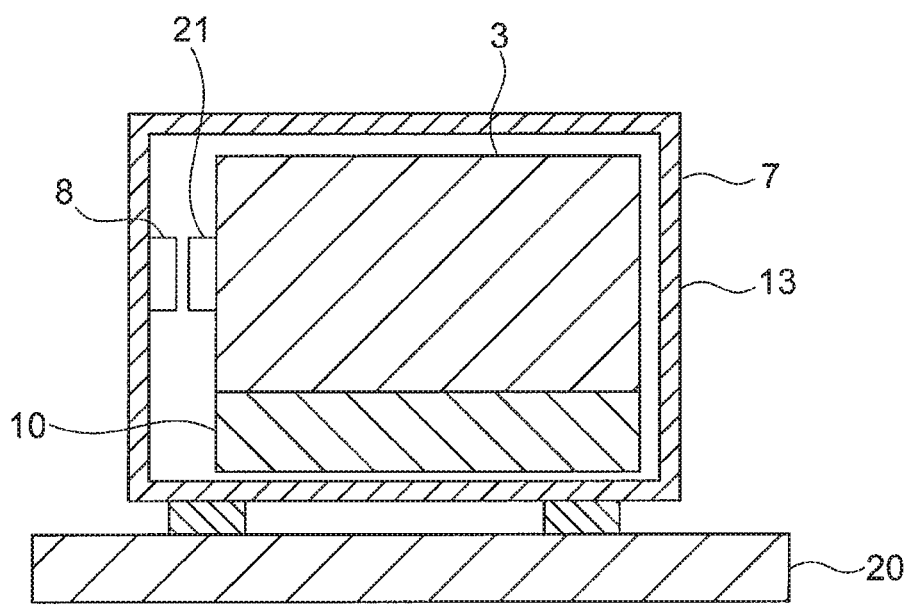
FIG. 4 is a cross-sectional view depicting an example of a configuration of a case and a high voltage battery according to Embodiment 1 of this invention.

The load 7 consumes the electric energy charged in the high voltage battery 3 in the case of an emergency, such as the collision of the vehicle. In concrete terms, when an emergency occurs, the electricity is discharged by electrically connecting the electrode of the high voltage battery 3 to the load 7. FIG. 4 depicts the configuration of the high voltage battery 3 and the load 7.

FIG. 4 is a cross-sectional view depicting the configuration of the high voltage battery 3, the load 7, and the cooling apparatus 10. As depicted in FIG. 4, the load 7 is constituted by a case 13 in this embodiment. The case 13 is constituted by a resistor. The case 13 is mounted on a battery mount 20. The case 13 and the battery mount 20 are fixed. The battery mount 20 has sufficient strength to support the case 13. The case 13 also has sufficient strength to protect the high voltage battery 3. As depicted in FIG. 4, the cooling apparatus 10 is disposed so as to contact the high voltage battery 3. The cooling apparatus 10 is constituted by a cooling fan, so that the cool air from the cooling fan is directly applied to the high voltage battery 3, and cools the high voltage battery 3. Thus the heat from the high voltage battery 3 dissipates by the driving of the cooling apparatus 10. Further, the high voltage battery 3 and the case 13 are disposed with a gap between each other. The high voltage battery 3 and the case 13 are insulated and electrically disconnected to prevent electric shock. The switch 8 is disposed between the high voltage battery 3 and the case 13, so that the electrode 21 of the high voltage battery 3 and the case 13 are electrically connected via the switch 8 when the switch 8 is switched by the command signal from the control unit 6. In this way, according to this embodiment, the load 7 is the case 13 (resistor) itself, and when such an emergency as a collision occurs, the switch 8 is switched by the control unit 6, and the load 7 and the electrode of the high voltage battery 3 are electrically connected via the switch 8, so as to discharge the electric energy charged in the high voltage battery 3.

Figure 2:
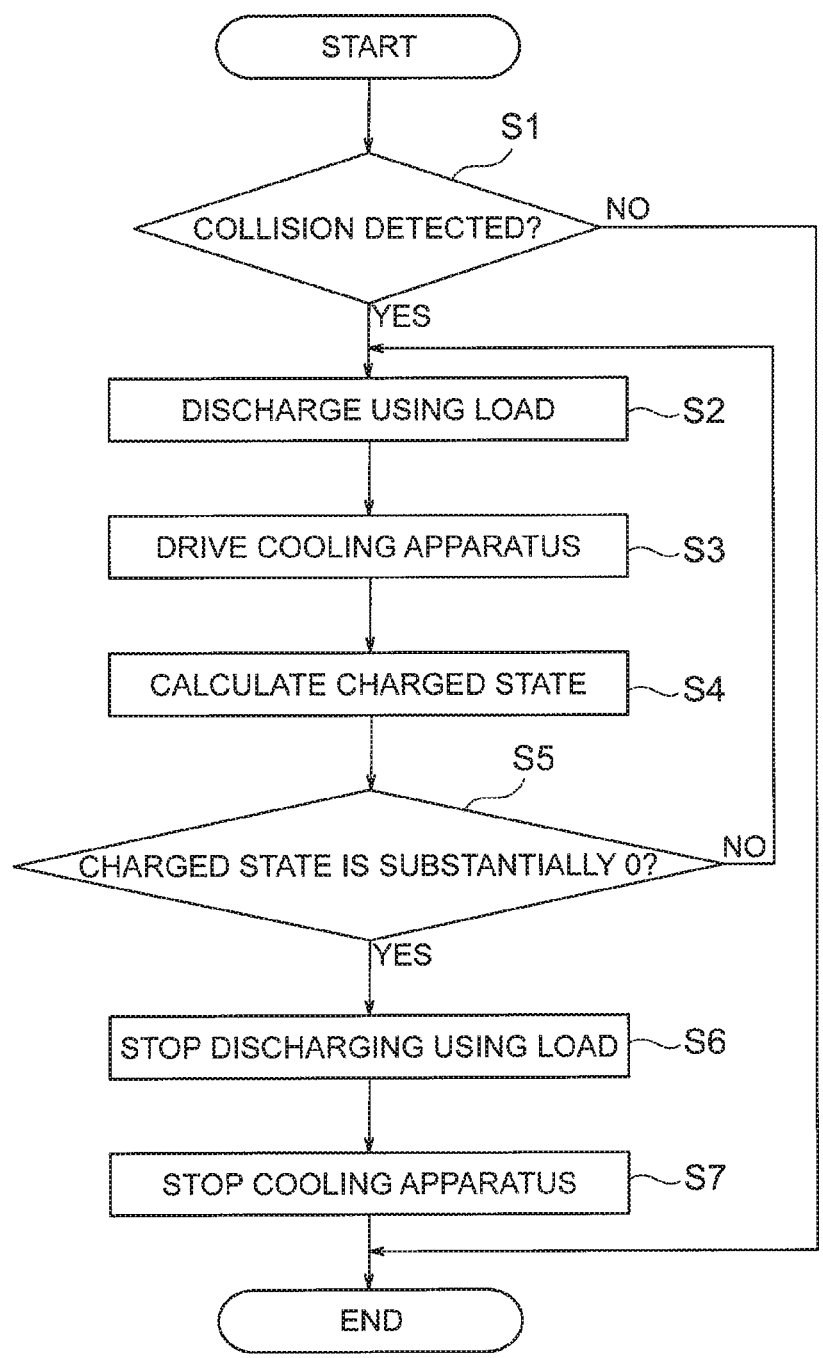
FIG. 2 is a flow chart depicting a processing of a control apparatus of the on-vehicle electric power storage apparatus according to Embodiment 1 of this invention.

FIG. 2 is a flow chart depicting a flow of the processing of the control unit 6 of the on-vehicle electric power storage apparatus 15 according to Embodiment 1 of this invention. The processing in FIG. 2 is periodically performed at a predetermined cycle. Here this cycle is 10 ms, for example, but the cycle is not limited to 10 ms, and may be set to any appropriate cycle.

As illustrated in FIG. 2, the control unit 6 detects the collision of the vehicle via the collision detection unit 14 in step S1. If the collision of the vehicle is not detected, processing ends.

If the collision of the vehicle is detected in step S1, processing advances to step S2. In step S2, the control unit 6 switches the switch 8, and starts discharging the electric energy stored in the high voltage battery 3 using the load 7.

In step S3, the control unit 6 cools the high voltage battery 3 by driving the cooling apparatus 10 using the electric energy of the high voltage battery 3.

In step S4, the computing unit 12 calculates the state of charge of the high voltage battery 3 based on the information of the current sensor and the voltage sensor of the high voltage battery 3. The control unit 6 acquires the calculation result of the state of charge of the high voltage battery 3 calculated by the computing unit 12.

In step S5, the control unit 6 determines whether the state of charge of the high voltage battery 3 is substantially zero (state of a dead battery). If the state is substantially zero, processing advances to step S6. If further discharge is attempted in the substantially zero state, an over-discharge occurs, where charging the battery is dangerous since a short circuit may be generated in the battery, causing smoke and combustion. If the state of charge is not substantially zero, processing returns to step S2.

In step S6, the control unit 6 switches the switch 8, and stops the discharge of the high voltage battery 3 by the load 7.

In step S7, the control unit 6 stops the cooling apparatus 10, and processing ends.

As a result, even if an accident occurs, heavy current is discharged using the load 7, and the high voltage battery 3 is cooled by the cooling apparatus 10, whereby safety can be improved.

As described above, the on-vehicle electric power storage apparatus 15 according to this embodiment is installed in a vehicle which has the on-vehicle power supply as a power source, and the on-vehicle power supply is constituted by the high voltage battery 3 which includes one or a plurality of batteries. The on-vehicle electric power storage apparatus 15 includes: the control unit 6 which performs internal control; the load 7 which is connected to the high voltage battery 3 based on a command from the control unit 6, and forcibly consumes power charged in the high voltage battery 3; and the cooling apparatus 10 which is driven based on a command from the control unit 6, and cools the high voltage battery 3. When the collision detection unit 14 detects a collision of the vehicle, the control unit 6 forcibly consumes the power of the high voltage battery 3 using the load 7, and cools the high voltage battery 3 by the cooling apparatus 10. According to this configuration of the on-vehicle electric power storage apparatus 15 of this embodiment, even if an accident occurs, heavy current is discharged from the high voltage battery 3, and the high voltage battery 3 is cooled by the cooling apparatus 10, therefore heating of the high voltage battery 3 can be suppressed, and combustion of the high voltage battery 3 can be prevented, whereby safety can be improved.

The on-vehicle electric power storage apparatus 15 according to this embodiment further includes the voltage dividing load 11 which is disposed between the high voltage battery 3 and the cooling apparatus 10. When a collision of the vehicle is detected, the control unit 6 connects the high voltage battery 3 and the cooling apparatus 10 via the voltage dividing load 11, divides the voltage of the high voltage battery 3 using the voltage dividing load 11, and applies the divided voltage to the cooling apparatus 10. This makes it unnecessary to install the cooling apparatus that can support high voltage, therefore the on-vehicle electric power storage apparatus 15 can be fabricated at low cost.

Furthermore, in the on-vehicle electric power storage apparatus 15 according to this embodiment, the cooling apparatus 10 is constituted by the cooling fan, and cool air from the cooling fan is directly applied to the high voltage battery 3. Since the cooling air from the cooling apparatus 10 can be directly applied to the high voltage battery 3 like this, the high voltage battery 3 that heated up due to the heavy current discharge can be efficiently cooled, and safety can be improved.

The cooling apparatus 10 is not limited to an air cooling type, such as the cooling fan, but may be a water cooling type.

In this embodiment, the voltage is reduced using the voltage dividing load 11, but the voltage may be reduced by a voltage conversion method using a transformer, in addition to this voltage dividing method.

Whether the cooling apparatus 10 is driven or not when a collision occurs may be determined based on an external signal, such as a signal from an engine control unit, instead of the signal from the control unit 6 inside the on-vehicle electric power storage apparatus 15.

Here the load 7 is the case 13 constituted by a resistor, but the present invention is not limited to this, and a resistor to constitute the load 7 may be installed separately in the on-vehicle electric power storage apparatus 15.

Needless to say, the high voltage battery 3 may be one battery or be constituted by a plurality of batteries.

The invention claimed is:

1. An on-vehicle electric power storage apparatus installed in a vehicle which has an on-vehicle power supply as a power source,
the on-vehicle power supply including one or a plurality of batteries,
the on-vehicle electric power storage apparatus comprising:

a control unit which performs internal control of the on-vehicle electric power storage apparatus;

a load which is connected to the on-vehicle power supply based on a command from the control unit, and forcibly consumes power charged in the on-vehicle power supply;

a cooling apparatus which is driven based on a command from the control unit, and cools the on-vehicle power supply, wherein when a collision of the vehicle is detected, the control unit forcibly consumes the power in the on-vehicle power supply using the load, and cools the on-vehicle power supply using the cooling apparatus; and a voltage dividing unit which is disposed between the on-vehicle power supply and the cooling apparatus, wherein when a collision of the vehicle is detected, the control unit connects the on-vehicle power supply and the cooling apparatus via the voltage dividing unit, divides the voltage of the on-vehicle power supply using the voltage dividing unit, and applies the divided voltage to the cooling apparatus.

2. The on-vehicle electric power storage apparatus according to claim 1, wherein the cooling apparatus is constituted by a cooling fan, and cools the on-vehicle power supply by directly applying cool air from the cooling fan to the on-vehicle power supply.

3. The on-vehicle electric power storage apparatus according to claim 1, wherein a first switch is arranged between the control unit and the voltage dividing unit to switch a state based on a command signal from the control unit, and wherein the first switch connects a low voltage battery and the load during a normal operation mode.

4. The on-vehicle electric power storage apparatus according to claim 3, wherein a second switch is arranged between the cooling apparatus and the control unit to switch a state based on the command signal from the control unit, and wherein the second switch connects the low voltage battery and the cooling apparatus during the normal operation mode.

\* \* \* \* \*